US012252874B2

(12) United States Patent
Rothman et al.

(10) Patent No.: US 12,252,874 B2
(45) Date of Patent: Mar. 18, 2025

(54) DECOUPLING TIDAL EFFECTS FROM WATER DEPTH MEASUREMENTS IN STORMWATER DRAINAGE SYSTEMS

(71) Applicant: Hadronex, Inc., Escondido, CA (US)

(72) Inventors: Erin Rothman, Seattle, WA (US); Suzie Housley, Seattle, WA (US); Marie Jordan, Seattle, WA (US); Jim Porzak, Seattle, WA (US)

(73) Assignee: HADRONEX, INC., Escondido, CA (US)

( * ) Notice: Subject to any disclaimer, the term of this patent is extended or adjusted under 35 U.S.C. 154(b) by 492 days.

(21) Appl. No.: 17/661,980

(22) Filed: May 4, 2022

(65) Prior Publication Data

US 2022/0356690 A1 Nov. 10, 2022

Related U.S. Application Data

(60) Provisional application No. 63/185,798, filed on May 7, 2021.

(51) Int. Cl.
*E03F 1/00* (2006.01)
*G01W 1/14* (2006.01)

(52) U.S. Cl.
CPC .............. *E03F 1/001* (2013.01); *G01W 1/14* (2013.01); *E03F 2201/10* (2013.01)

(58) Field of Classification Search
CPC ........ E03F 1/001; E03F 2201/10; G01W 1/14
See application file for complete search history.

(56) References Cited

U.S. PATENT DOCUMENTS

| | | | | |
|---|---|---|---|---|
| 10,292,025 | B2* | 5/2019 | Stettler | H04W 4/38 |
| 10,430,725 | B2* | 10/2019 | Anderson | G06N 20/00 |
| 2011/0278212 | A1* | 11/2011 | Tyner | B01D 21/2422 |
| | | | | 137/561 A |
| 2013/0066568 | A1 | 3/2013 | Alonso | |
| 2016/0047486 | A1* | 2/2016 | Moody | G05D 7/0146 |
| | | | | 137/430 |
| 2016/0209260 | A1* | 7/2016 | Rice | G01S 13/583 |
| 2020/0116693 | A1* | 4/2020 | Bertini | G08B 21/18 |
| 2021/0063269 | A1 | 3/2021 | Ramirez Garcia | |

OTHER PUBLICATIONS

International Search Report and Written Opinion received for PCT Application No. PCT/US22/27899, mailed on Sep. 12, 2022, 5 pages.

* cited by examiner

*Primary Examiner* — Thomas D Alunkal
(74) *Attorney, Agent, or Firm* — Jonathan Kidney; Intelink Law Group, PC

(57) ABSTRACT

The invention is directed towards decoupling tidal effects from time-series depth measurements. A drainage sensor includes a fluid depth sensor. The drainage sensors are positioned at monitoring points in a drainage system. Stormwater flows into an input of the drainage system. A tidal depth sensor is positioned in a tidal body of water near an output of the drainage system. During period of high tide, tidal water backflows into the output of the drainage system. The decoupling is accomplished by generating a model of tidal backflow patterns based on data from the drainage sensors and the tidal sensor. The model accounts for a lag time between the tidal data measurements and measurements of the drainage sensors. The model is be used to predict the contribution of tidal backflow effects to stormwater data.

20 Claims, 11 Drawing Sheets

(High Tide)

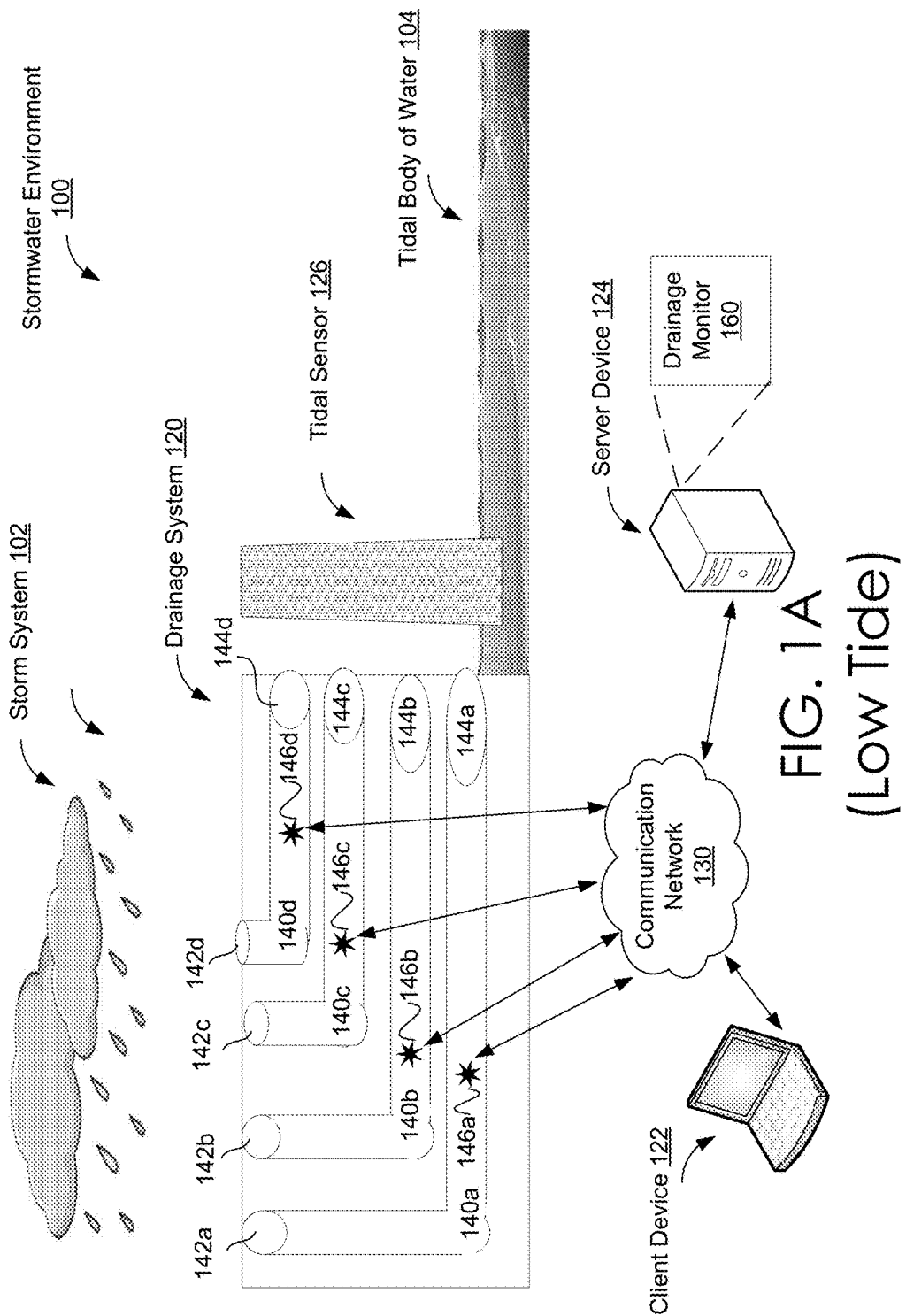
FIG. 1A (Low Tide)

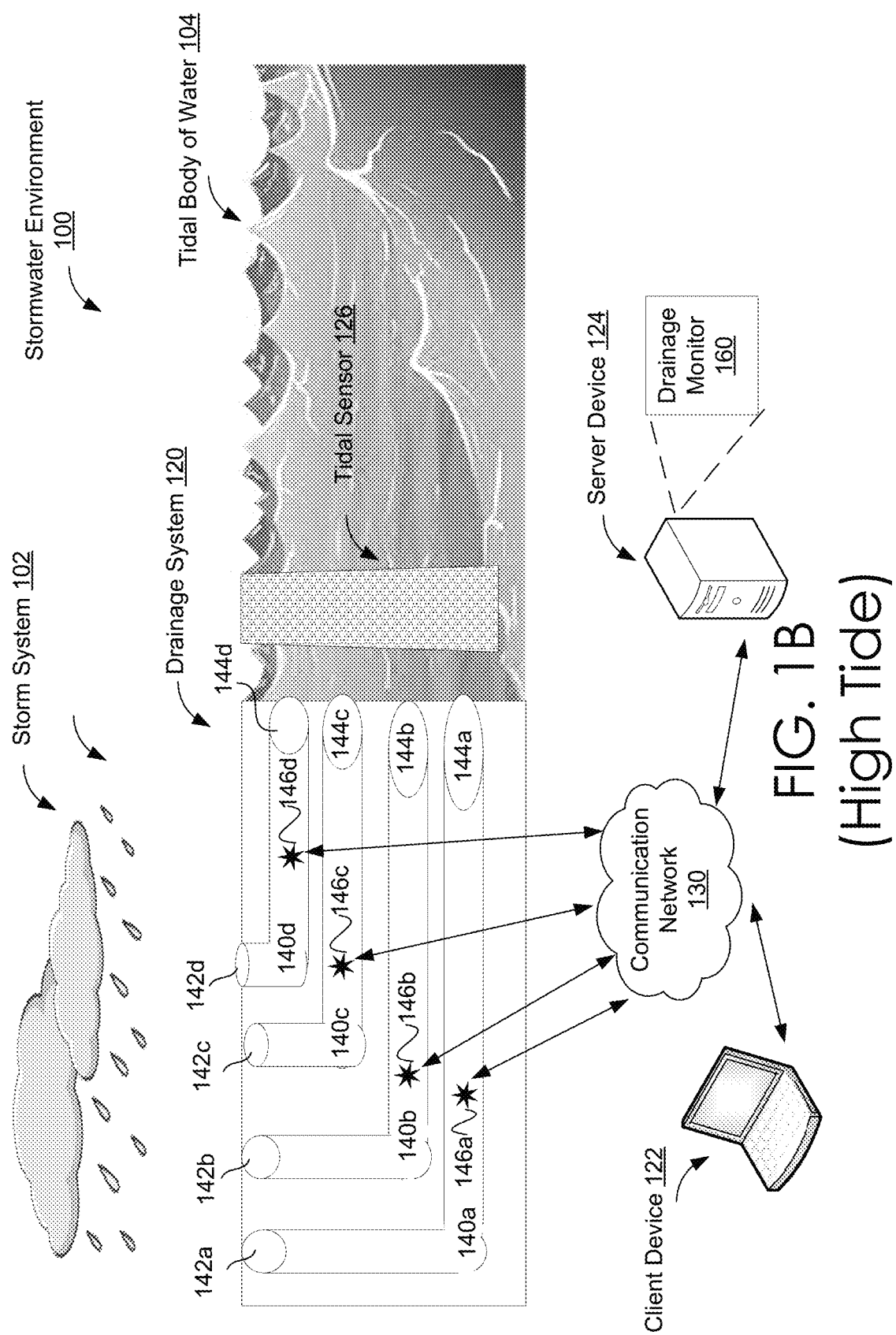
FIG. 1B (High Tide)

DECOUPLING TIDAL EFFECTS FROM WATER DEPTH MEASUREMENTS IN STORMWATER DRAINAGE SYSTEMS

CROSS-REFERENCE TO RELATED APPLICATIONS

This application is claims priority to U.S. Provisional Patent Application No. 63/185,798, entitled DECOUPLING TIDAL EFFECTS FROM WATER DEPTH MEASUREMENTS, filed May 7, 2021, the contents of which is hereby incorporated by reference in its entirety.

BACKGROUND

Stormwater management system operators are subject to local and federal regulations that require operators account for and report overflow events, particularly sanitary and combined sewer overflow events. Moreover, operators need to understand causes of overflow events for capacity and maintenance planning and other purposes. Many stormwater management systems carry water from a variety of sources, including sanitary sewers, stormwater, and backflow from the system's terminal waterways. For a given overflow event, it can be difficult for operators to determine which source of water contributed to the overflow.

SUMMARY

Various aspects of the technology described herein are generally directed towards one or more of methods, system, and/or non-transitory computer readable storage media. Embodiments of the present invention are directed toward systems and methods for decoupling (e.g., subtracting out) tidal effects from time-series water depth measurements. In some embodiments, such systems and methods are applied to historical stormwater data and waterway tidal data. In other embodiments, such systems and methods are applied to real- or near real-time stormwater and waterway tidal data. In such embodiments, a sensor device includes one or more fluid depth sensors and a data transmitter device. The one or more sensors may be configured within a sensor array. Each of the sensors generates data in response to a fluid communication with stormwater or with waterways. Thus, in some embodiments, some sensors (e.g., drainage sensors) may include operations for generating the stormwater data in response to an exposure to the stormwater. Other sensors may include operations for generating the waterway tidal data in response to an exposure to the waterway. The transmitter device may receive other water data from one or more other devices, such as but not limited to another sensor device, either the same or different from those other sensor devices which received stormwater data or tidal waterway data. For instance, the transmitter device may be a local-data transmitter device. Thus, in some embodiments, the sensor device may be a sensor node.

A data-collection device may be employed to aggregate and buffer the stormwater data that is acquired from the stormwater sensor devices. The data-collection device is employed to periodically provide a user-computing device (e.g., the remote computing device) the aggregated stormwater data at a rate based on the data-transmission rate for the data-collection device. The user computer may be running and/or hosting a stormwater monitoring application (SMA) that is employed to receive the stormwater data and generate one or more stormwater reports or visualizations based on the measured stormwater data. For instance, the stormwater measurement may be a site-level stormwater measurement. A display device of the user-computing device may provide a visualization (e.g., a plot, graph, chart, or the like) of the stormwater measurements.

In various embodiments, decoupling might be accomplished by developing a linear model of waterway tidal backflow patterns. In some such embodiments, the model may account for lag time between the waterway tidal data measurements and water flows to a location of the stormwater sensor. The linear model can then be used to predict the contribution of tidal backflow effects to stormwater data. In some embodiments, the system may be configured to update the linear model in response to changes in the lag time, seasonal differences in tidal patterns, or physical changes to the stormwater drainage system. Note that the embodiments are not limited to linear models, and other model types may be employed. For example, the model may be a polynomial model, an exponential model, a periodic series model, or any combination thereof.

In some embodiments, the systems and methods may be configured to generate real-time or predictive flow alerts for stormwater managers. In at least one embodiment, the system may attribute the alert to a specific cause, such as for example tidal effects or human dumping. A similar embodiment may further receive local weather report data and attribute the flow event to a stormwater surge. Advantageously, the manager could then take remedial steps to address the flow event.

More particularly, one exemplary, but non-limiting method embodiment may include receiving first drainage sensor data from a set of drainage sensors located at a set of monitoring points in a set of flow paths of a drainage system. The first drainage sensor data may encode an indication of a first time-series of a depth of a fluid detected at by the set of drainage sensors located at the set on monitoring points within the drainage system. The fluid associated with the first drainage sensor data may include at least tidal-backflow water from a body of water that is subject to a tidal effect (e.g., a tidal body of water). The tidal effect of the body of water may include a rising of a tide of the body of water and/or a lowering of the tide of the body of water. In at least one embodiment, the fluid associated with the first drainage sensor data may further include stormwater. First tidal sensor data may be received from one or more tidal sensors. The first tidal sensor day may encode an indication of a first time-series of the tidal effect of the body of water. A depth model may be generated based on the first drainage sensor data and the first tidal sensor data. The depth model may model one or more statistical-correlations between the first time-series of the depth of fluid and the first tidal effect of the body of water. The depth model may be a linear model. Second drainage sensor data may be received from the set of drainage sensors located at the set of monitoring points in the set of flow paths of the drainage system. The second drainage sensor data may encode an indication of a second time-series of the depth of the fluid detected at the set on monitoring points within the drainage system. The fluid associated with the second drainage sensor data may include at least stormwater and the tidal-backflow water from the body of water. Second tidal sensor data may be received from the one or more tidal sensors. The second tidal sensor day may encode an indication of a second time-series of the tidal effect of the body of water. A first component of the second time-series of the depth of the fluid may be determined. Determining the first component of the second time-series of the depth of the fluid may be based on the depth model, the second drainage sensor data, and the second tidal sensor data. The first component of the second time-series of the depth of the fluid may indicate a depth associated with the stormwater

BRIEF DESCRIPTION OF THE DRAWINGS

The technology described herein is described in detail below with reference to the attached drawing figures, wherein:

FIG. 1A includes a block diagram showing a stormwater environment in a low-tide scenario, in which some embodiments of the present disclosure may be employed;

FIG. 1B includes a block diagram showing the stormwater environment in a high-tide scenario, in which some embodiments of the present disclosure may be employed;

DETAILED DESCRIPTION

Figure 2:
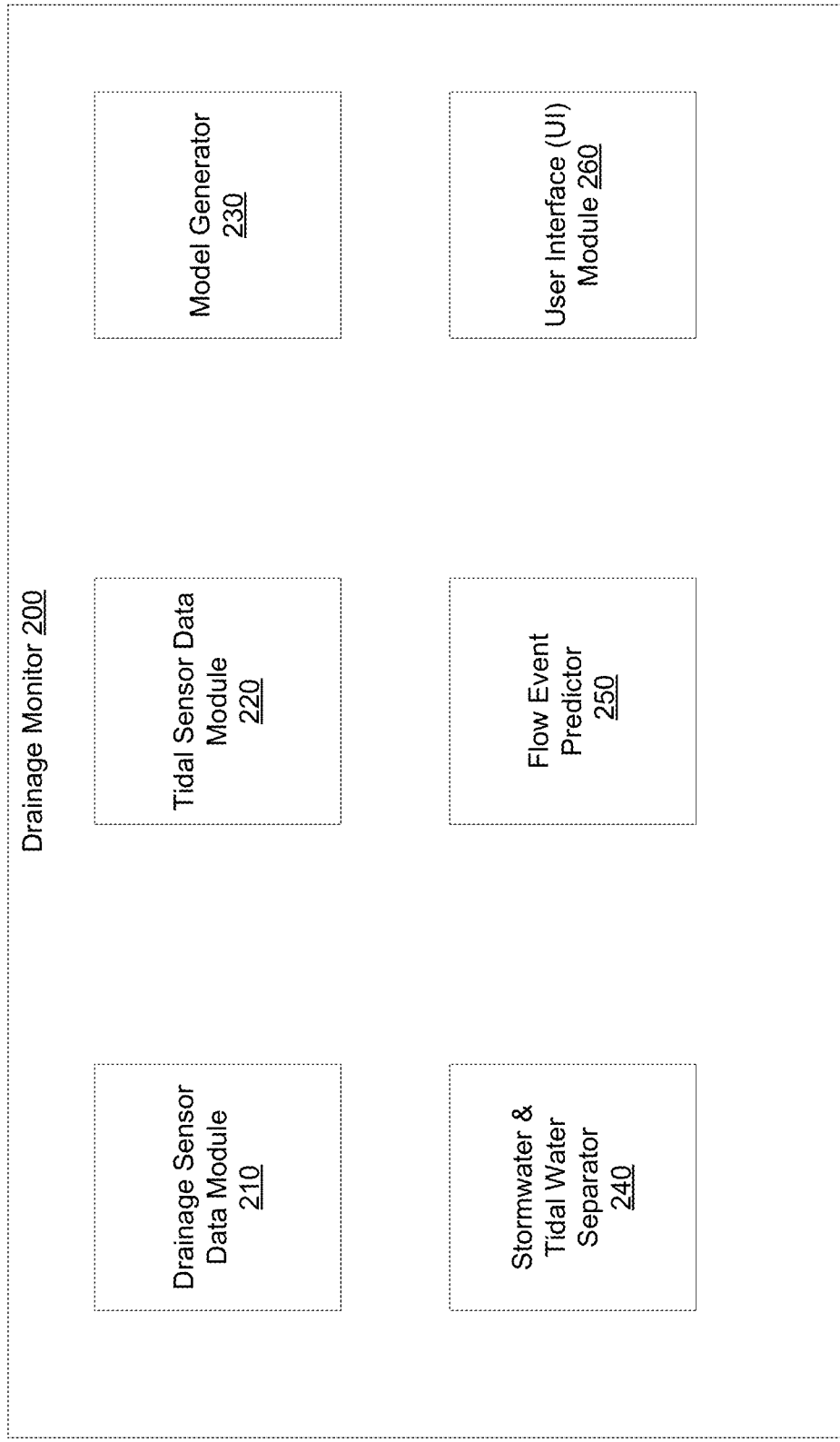
FIG. 2 includes a block diagram showing drainage monitor that is consistent with the various embodiments.

Overview of Technical Problems, Technical Solutions, and Technological Improvements Stormwater drainage systems (e.g., storm drains and sewers) are employed to redirect excess rain and ground water from impervious surfaces through a network of flow paths and/or flow channels. Such flow paths and/or channels are typically constructed via cavities, flow paths, or flow channels within pipes, tunnels, gutters, and the like. Such systems may also carry sewage and wastewater from human activities. Such systems may output water into nearby rivers, streams, or other waterways. Thus, such drainage systems may include a set of fluid inputs (e.g., apertures in which stormwater, sewage, and wastewater enter the drainage system). Drainage systems may additionally include a set of fluid outputs (e.g., apertures in which stormwater, sewage, and wastewater exit the drainage system).

The set of fluid inputs and the set of fluid outputs define a "forward" flow through the drainage system, as well as a "backwards" or "reverse" flow through the system. A forward flow may be a flow in the direction of from "upstream" to "downstream." In contrast, a backward flow may be a flow in the direction from "downstream" to "upstream." The terms "upstream" and "downstream" are relative terms with respect to the inputs and outputs of the drainage system. When discussing two positions within a drainage system (e.g., a first position and a second position), the first position is upstream of the second position if the first position is closer to the inputs of the system than the second position. In contrast, the second position is downstream from the first position if the second position is closer to the outputs of the system and the first position.

Note that at least a subset of the set of fluid outputs may output water into a body of water that is subject to tidal effects (e.g., the gravitational field generated by the Moon's mass that raises and lowers the "local" water level of such water bodies as the Moon orbits the Earth). Drainage system capacity may be reduced as tidal cycles in such waterways cause water to return up such systems' flow paths. For example, a rising tide may generate a "backflow" of tidal water into a stormwater drainage system. That is, the rising tide may generate a "backwards" flow of water through the drainage system and such backflow may force tidal water into the drainage system, causing an increase in the water level within the drainage system. Water flowing into the drainage system via its inputs may be referred to as system inflow, water flowing out of the system via its outputs may be referred to as outflow, and water flowing into the system via its outputs may be referred to as backflow.

If the water level in the drainage system is raised beyond a system threshold or capacity, a sufficient backpressure in the system may force water out of the system's inputs, resulting in a "flow" event. Thus, a rising tide can cause flow events to occur. Such increased water levels within a drainage system may occur due to excessive stormwater being input into the system's inputs and/or a rising tide forcing a backflow into the system via the system's outputs. Flow events in a drainage system cause security, safety, and health concerns within the environment and/or community that the drainage system is embedded in. Flow event may include, but are not limited to overflow events (e.g., exceeding the system's total capacity), stormwater flow events (e.g., stormwater flowing through the system), dry weather floe events, and the like.

As explained herein, data from water depth sensors within a stormwater system (or a drainage system) and sensors within terminal waterways can be analyzed to predict the tidal backflow contribution to the system's flow volume. For example, the National Oceanic and Atmosphere Administration (NOAA) provides real-time water level information that is updated every 6 minutes. A model can be derived by pairing depth data from tidal sensors (e.g., sensors that NOAA or other actors employ to generate real-time water level information) with depth data from in-system sensors. That is, the water depth sensors may measure a height of water within the stormwater drainage system. Such water depth sensors installed in the stormwater drainage systems may be referred to as drainage sensors. The water height or level measured by a drainage sensor may include a first component (or contribution) associated with the stormwater/ sewage flowing "forward" into the system, while the second component (or contribution) is associated with the tidal water flowing "backward" into the system, via system backflow.

The embodiments employ the model to determine the tidal component (e.g., the second component). The second component may be subtracted from the height (or depth) measurements to determine the first component (e.g., the component associated with stormwater/sewage systems). The second component may be referred to as the tidal contribution. By subtracting out the depth due to tidal backflow (e.g., determined based on the tidal sensors), flow events can be easily detected and more accurately measured.

Environments and Systems for Decoupling Tidal Effects from Water Depth Measurements Aspects of the technical solution can be described by way of examples and with reference to FIG. 1A and additional illustrations below. FIG. 1A includes a block diagram showing a stormwater environment 100 in a low-tide scenario, in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Stormwater environment 100 includes a drainage (or stormwater) system, such as but not limited to drainage system 120. Drainage systems are employed to redirect excess rain and ground water from impervious surfaces through a network of flow paths and/or flow channels (e.g., set of flow paths 140a-d). Such flow paths and/or channels are typically constructed via cavities, flow paths, or flow channels within pipes, tunnels, gutters, and the like. Drainage systems may also carry sewage and wastewater from human activities. Drainage systems may output water into nearby rivers, streams, or other waterways (e.g., tidal body of water 104). Thus, drainage systems may include a set of fluid inputs (e.g., set of fluid inputs 142a-d). Drainage system may additionally include a set of fluid outputs (e.g., set of fluid outputs 144a-d), and wastewater exit the drainage system.

Among the components explicitly shown in FIG. 1A, stormwater environment 100 includes a storm system 102, a stormwater drainage system 120, and a tidal body of water 104. The storm drainage system 120 includes a set of flow paths 140a-d, which comprises a network of flow paths and/or flow channels of the drainage system 120. The set of flow paths 140a-d includes a set of inputs 142a-d and a set of outputs 144a-d. Note that the configuration of the set of flow paths 140a-d and the associated set of inputs 142a-d and the associated set of outputs 144a-d shown in FIG. 1A are for illustrative purposes only, and the respective configurations may vary in the embodiments. The storm system 102 delivers stormwater to the set of inputs 142a-d of the drainage system 120. The stormwater may flow from the set of inputs 142a-d, through the set of flow paths 140a-d, and out of the set of outputs 144a-d. The set of outputs 144a-d may terminate at the tidal body of water 104, such that the stormwater may flow from the set of inputs 142a-d and into the tidal body of water 104.

The tidal body of water 102 may be a body of water that is subject to tidal effects, such as but not limited to an ocean, a bay, a sound, a large lake, or the like. Note that a body of water that is subject to tidal effects may include a body of water large enough such that a gravitational field (e.g., a gravitational field due to the presence of the moon orbiting the Earth) may not be considered uniform across the body of water. As shown in FIG. 1A, the portion of the tidal body of water 104 near the drainage system 120 is currently subject to a "low tide" scenario of the tidal effect. In contrast, FIG. 1B shows the tidal body of water 104 in a "high-tide" scenario of the tidal effect.

When is the low-tide scenario of FIG. 1A, the stormwater may flow freely from the set of inputs 142a-d, out of the set of outputs 144a-d, and into the tidal body of water 104. In the high-tide scenario of FIG. 1B, water from the tidal body of water 104 may flow into the set of outputs 144a-d and into the set of flow paths 140a-d. As discussed in conjunction with at least FIG. 1B, such backflow of the tidal body of water 104 into the set of flow paths 140a-d causes backpressure in the set of flow paths 140a-d and creating a mixture of both stormwater and water from the tidal body of water 104.

Drainage system 120 may also include a set of drainage sensors 146a-d embedded in the set of flow paths 140a-d. The location of a particular drainage sensor (e.g., drainage sensor 246a) within a flow path (e.g., flow path 140a) may be referred to as a monitoring point (MP) within the drainage system 120. A drainage senor of the set of drainage sensors 146a-d may include at least a water depth (or water depth) sensor and a transmitter device that is enabled to at least transmit data generated by the sensor device (e.g., including at least water depth or water level data generated by the water depth sensor). A drainage sensor may be referred to as a stormwater sensor. Various embodiments of (drainage or stormwater) sensor devices are discussed in conjunction with in conjunction with U.S. Pat. No. 10,292,025, entitled "Sensor Devices and Networks Acquiring Stormwater Data," issued on May 4, 2019, the contents of which are herein incorporated in their entirety. U.S. Pat. No. 10,292,025 may be referred to throughout at the '025 patent. Various embodiments of a drainage system (e.g., drainage system 120) are also discussed in conjunction with the '025 patent. A drainage system may be referred to as a stormwater system.

Drainage system 120 may additional include a tidal sensor 126. Tidal sensor 126 may be enabled to detect and measure a water level (or a water depth) associated with the tidal condition of the tidal body of water 104. Drainage system 120 may also include a client computing device 122, a server computing device 124, and a communication network 130. The communication network 130 may commutatively couple the client device 122, the server device 123, each drainage sensor of the set of drainage sensors 146a-d, and the tidal sensor 126. At least one of the client device 122 and/or the service device 124 may implement a drainage monitor 160.

Communication network 130 may be a general or specific communication network. Communication network 130 may be any communication network, including virtually any wired and/or wireless communication technologies, wired and/or wireless communication protocols, and the like. Communication network 130 may be virtually any communication network that communicatively couples a plurality of computing devices and storage devices in such a way as to computing devices to exchange information via communication network 130.

It should be understood that environment 100 shown in FIG. 1A is an example of one suitable operating environment. Each of the components shown in FIG. 1A may be implemented via any type of computing device, such as computing device 900 described in connection to FIG. 9, for example. These components may communicate with each other via network 110, which may include, without limitation, a local area network (LAN) and/or a wide area networks (WAN). In exemplary implementations, communications network 110 comprises the Internet and/or a cellular network, amongst any of a variety of possible public and/or private networks. Operating environment 100 can be utilized to implement any of the various embodiments described herein.

FIG. 1B includes a block diagram showing the stormwater environment 100 in a high-tide scenario, in which some embodiments of the present disclosure may be employed. In contrast to FIG. 1A, where the tidal body of water 104 is in a low-tide scenario, the tidal body of water 104 in FIG. 1B is in a high-tide scenario. Thus, in FIG. 1A, the tidal sensor 126 will measure a relatively low water level for the tidal body of water 104, while in FIG. 1B, the tidal sensor 126 will measure a relatively high water level for the tidal body of water 104.

The set of fluid inputs 142a-d and the set of fluid outputs 144a-d define a "forward" flow through the drainage system 120, as well as a "backwards" or "reverse" flow through the system. A forward flow may be a flow in the direction of from "upstream" to "downstream." In contrast, a backward flow may be a flow in the direction from "downstream" to "upstream." The terms "upstream" and "downstream" are relative terms with respect to the set of inputs 142a-d and the set of outputs 144a-d of the drainage system 120. When discussing two positions within a drainage system (e.g., a first position and a second position), the first position is upstream of the second position if the first position is closer to the set of inputs 142a-d of the drainage system 120 than the second position. In contrast, the second position is downstream from the first position if the second position is closer to the set of outputs 144a-d of the drainage system 120 than the first position.

The capacity of the set of flow paths 140a-d of drainage system 120 may be reduced in the high-tide scenario of FIG. 1B due to backflow flow of tidal waters from tidal body of water 104 into the set of outputs 144a-d and into the set of flow paths 140a-d. For example, a rising tide may generate a "backflow" of tidal water into a stormwater drainage system. That is, the rising tide may generate a "backwards" flow of water through the drainage system and such backflow may force tidal water into the drainage system, causing an increase in the water level within the drainage system 120. Stormwater from storm system 102 flowing into the drainage system 120 via its set of inputs 142a-d may be referred to as system inflow, water flowing out of the system 120 via its set of outputs 144a-d may be referred to as outflow, and tidal water flowing into the system 120 via its set of outputs 144a-d may be referred to as backflow. Accordingly, at any particular time, the water within the set of flow paths 140a-d may be a combination of stormwater from the storm system 102 (as well as other sources) and tidal water from the tidal body of water 104.

If the water level in the set of flow paths 140a-d the drainage system 120 is raised beyond a system threshold or capacity, a sufficient backpressure in the set of flow paths 140a-d of system 120 may force water out of the set of inputs 142a-d, resulting in a "flow" event. Thus, exceeding system capacity can cause flow events to occur. Such increased water levels within the set of flow paths 140a-d of drainage system 120 may occur due to excessive stormwater being input into the set of inputs 142a-d and/or a rising tide of tidal body of water 104 forcing a backflow into the system 120 via the set of outputs 144a-d. Flow events in a drainage system 120 cause security, safety, and health concerns within the stormwater environment 100 and/or community that the drainage system 120 is embedded in.

Drainage monitor 160, implemented by server device 124 (or client device 122), monitors real-time water levels in the set of flow paths 140a-d, as well as detects and/or predicts flow events. Various embodiments of a drainage monitor are discussed in conjunction with at least FIG. 2. However, briefly here, the set of drainage sensors 146a-d monitor the real-time depth (or height) of water in the set of flow paths 140a-d. Such drainage depth data may be transmitted to server device 124 (or client device 122), via transmission devices included in the set of drainage sensors 146a-d. As noted above, at any particular time, the water within the set of flow paths 140a-d may be a combination of stormwater from the storm system 102 (as well as other sources) and tidal water from the tidal body of water 104. The operations of drainage monitor 160 include separating (or decoupling) the stormwater and the tidal water. That is, drainage monitor 160 is enabled to determine the portion of the water in the set of flow paths 140s-d that is attributable to stormwater (or other water sources that enter the set of flow paths 140a-d through the set of inputs 142a-d) and the portion of water that is attributable to the tidal body of water 104 (or other sources of backflow into the set outputs 144a-d). At also noted above, the server device 124 (or the client device 122) receives tidal data from the tidal sensor 104. The tidal data includes the height of the tidal scenario.

Exemplary Embodiment of a Drainage Monitor

FIG. 2 includes a block diagram showing drainage monitor 200 that is consistent with the various embodiments. Drainage monitor 200 may be similar to drainage monitor 160 of FIGS. 1A-1B. Drainage monitor 200 (as well as drainage monitor 160) may include various components and/or modules. In the non-limiting embodiment of FIG. 2, drainage monitor 200 may include at least a drainage sensor data module 210, a tidal sensor data module 220, and a model generator 230. Drainage module 200 may also include a storm & tidal water separator 240, a flow event predictor 250, and an user interface (UI) module 260. Drainage monitor 160 may include equivalent, similar, and/or alternative components and modules. The various functionalities and operations of these components and/or modules discussed below.

The drainage sensor data module 210 is generally responsible for receiving drainage sensor data from drainage sensors (e.g., the set of drainage sensors 146a-d of FIGS. 1A-1B). Such drainage sensor data may include at least time-series data indicating the fluid depth in the set of flow paths 140a-d of FIGS. 1A-1B, as a function of time. The drainage sensor data may be received in a real-time mode or in an offline mode. The tidal sensor data module 220 is generally responsible for receiving tidal sensor data from tidal sensors (e.g., tidal sensor 126 of FIGS. 1A-1B). Such tidal sensor data may include at least time-series data indicating the tidal height for a tidal body of water (tidal body of water 104 of FIGS. 1A-1B), as a function of time. The tidal sensor data may be received in a real-time mode or in an offline mode.

The model generator 230 is generally responsible for generating a model based on a combination of the drainage sensor data and the tidal sensor data. The model may be a model of waterway tidal backflow patterns. The model may be a linear model. In some such embodiments, the model may account for lag time between the tidal data measurements (as encoded in the tidal sensor data) and water flows (of the tidal water via tidal backflow) to a location of the drainage sensor (as encoded in the drainage sensor data). The linear model can then be used to predict the contribution of tidal backflow effects to stormwater (or drainage) data. In some embodiments, the model generator 230 may be configured to update the linear model in response to changes in the lag time, seasonal differences in tidal patterns, or physical changes to the stormwater drainage system. Note that the embodiments are not limited to linear models, and other model types may be employed. For example, the model may be a polynomial model, an exponential model, a periodic series model, or any combination thereof.

The stormwater and tidal water separator 240 is generally responsible for employing the model generated by the model generator 230 to separate the tide (or tidal) water component from the stormwater component of the fluid depth measurements encoded in the drainage sensor data stream. More specifically, the stormwater and tidal water separator 240 may employ the model to determine the tidal component and the stormwater (or drainage) component of the fluid depth in the set of flow paths 140a-d of FIGS. 1A-1B. The tidal component may be subtracted from the height (or depth) measurements of the drainage sensors to determine the stormwater (or drainage) component.

The flow event predictor 250 is generally responsible for predicting a potential flow event, before it occurs. The flow event predictor 250 predicts over flow events based on subtracting out the depth due to tidal backflow (e.g., subtracting out the tidal component from the height of the depth measurements of the set of flow paths 140a-d). Via the prediction of such events, flow events can be easily detected and more accurately measured. The UI module 260 is generally responsible for providing one or more UIs to a user to inform the user regarding the prediction of flow events.

For a monitoring point (e.g., a location of a sensor device of the set of sensor devices 146a-d of FIGS. 1A-1B) within a drainage system (e.g., drainage system 120 of FIGS. 1A-1B), drainage monitor 200 may determine whether that monitoring point exhibits tidal backflow. If the monitoring point exhibits tidal backflow, the tidal backflow may be modeled using data from a water level station (e.g., tidal sensor 126 of FIGS. 1A-1B) in the tidal body of water 104 of FIGS. 1A-1B, such as those operated by NOAA or others. The model (e.g., generated by model generator 230) may be used to predict depth at the monitoring point based on tidal water level (e.g., indicated in the tidal sensor data stream) in the tidal body of water 104. Additionally, in some embodiments the model can be periodically checked for accurate performance and updated if it is not performing as expected.

Example Methods for Decoupling Stormwater and Tidal Water in a Drainage System

Figure 3A:
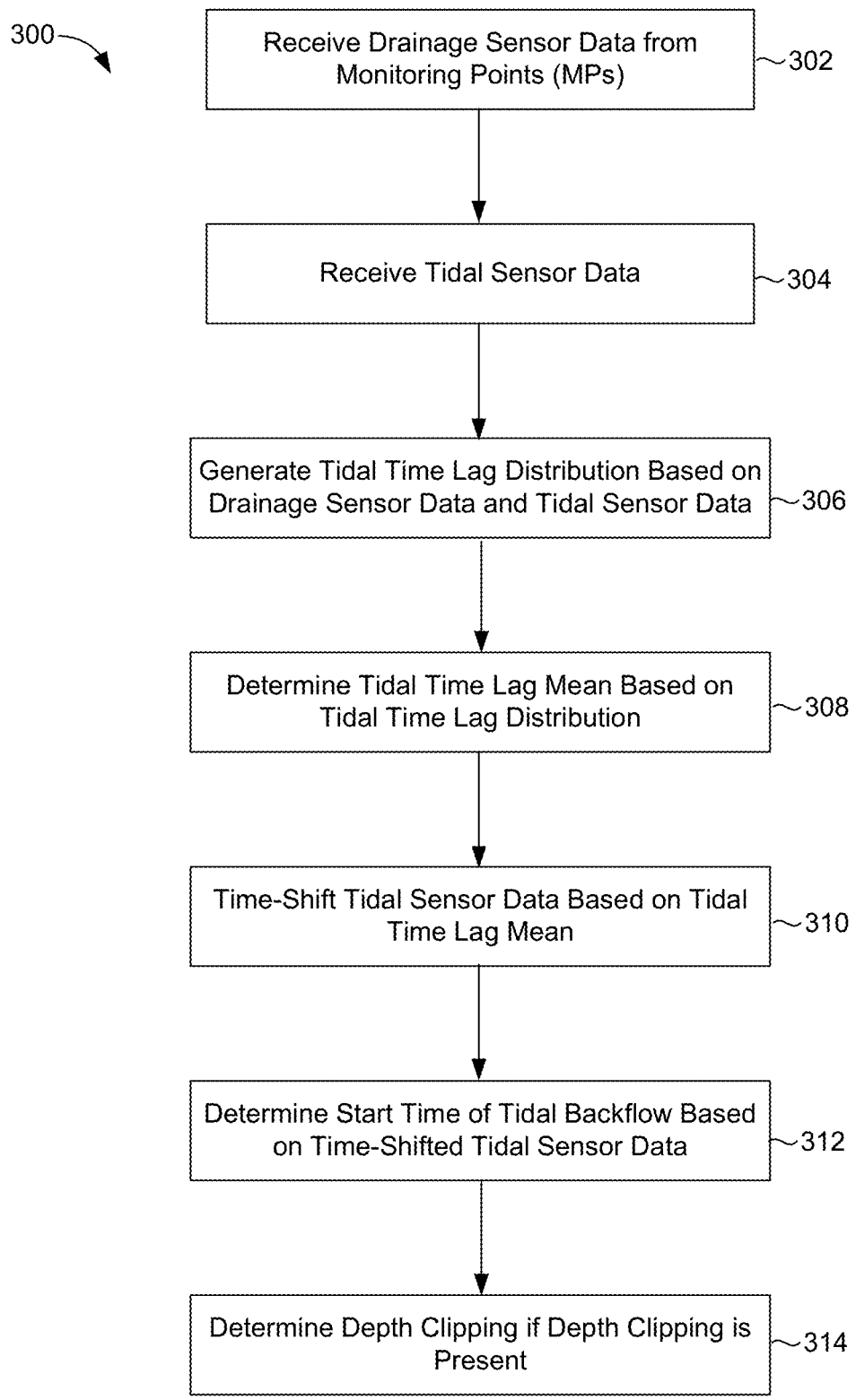
FIG. 3A provides a flow diagram that illustrates a method for decoupling stormwater and tidal water in a drainage system that is consistent with the various embodiments.
Figure 3B:
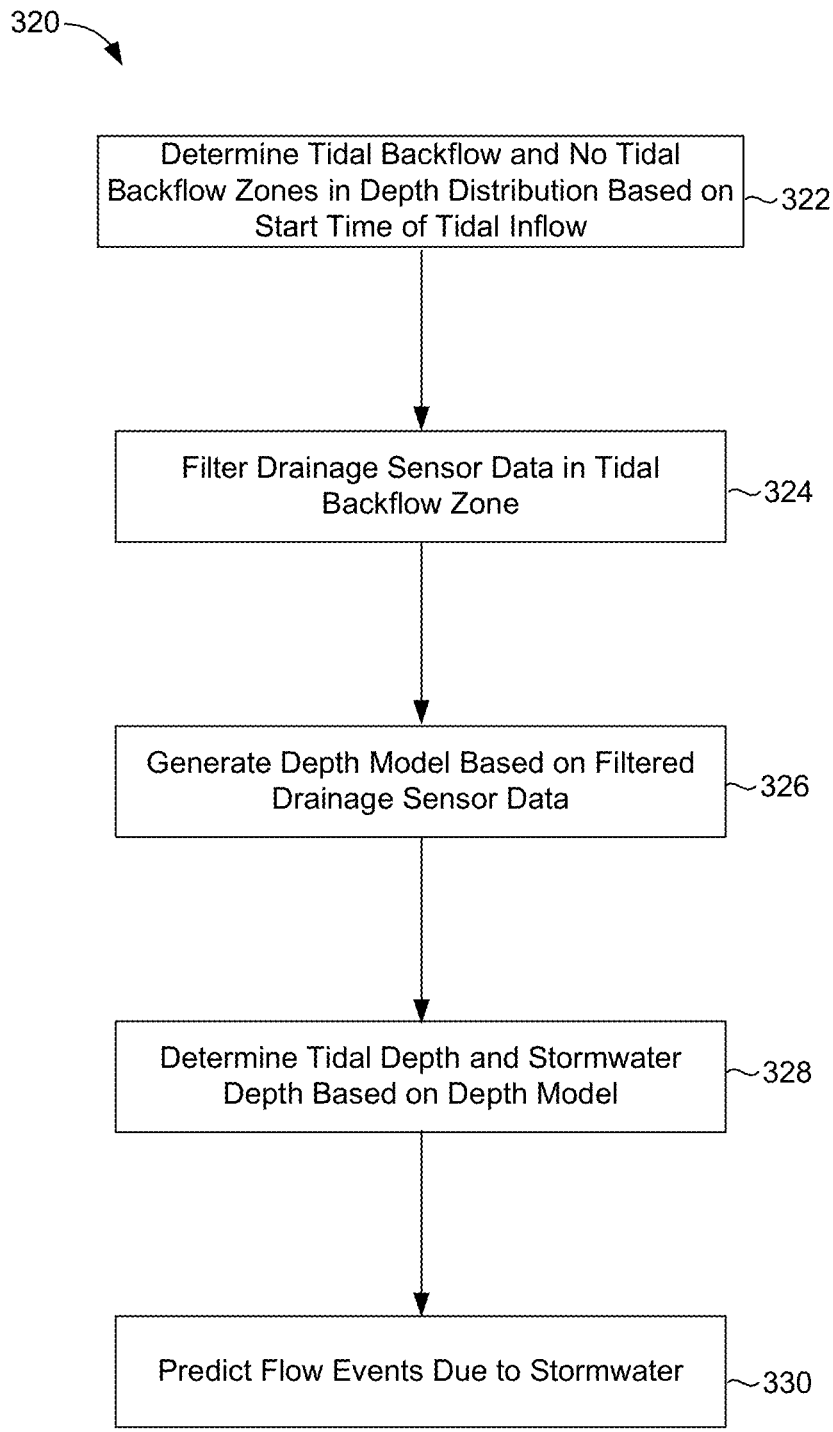
FIG. 3B provides a flow diagram that illustrates a method for decoupling stormwater and tidal water in a drainage system that is consistent with the various embodiments.

With reference to FIGS. 3A-3B, flow diagrams are provided illustrating methods for decoupling stormwater and tidal water in a drainage system, such as but not limited to drainage system 120 of FIGS. 1A-1B. The methods may be performed using any of the embodiments of a described herein. For example, a drainage monitor (e.g., drainage monitor 160 of FIGS. 1A-1B and/or drainage monitor 200 of FIG. 2) may implement at least a portion of the methods and/or actions discussed in the context of FIGS. 3B-3B. In embodiments, one or more computer storage media having computer-executable instructions embodied thereon that, when executed, by one or more processors can cause the one or more processors to perform the methods in the storage system.

Turning to FIG. 3A, a flow diagram is provided that illustrates a method 300 for decoupling stormwater and tidal water in a drainage system that is consistent with the various embodiments. Such drainage systems include, but are not limited to drainage system 120 of FIGS. 1A-1B. Method 300 begins at block 302, where drain sensor data is received from the drainage sensors (e.g., the set of drainage sensors 146a-d of FIGS. 1A-1B) located at one or more monitoring points (MPs) in the flow paths (e.g., the set of flow paths 140a-d of FIGS. 1A-1B) of the drainage system. A drainage sensor data module (e.g., 210 of FIG. 2) of a drainage monitor (e.g., drainage monitor 200 of FIG. 2) may receive the drainage sensor data. At block 304, tidal sensor data is received from a tidal sensor (e.g., tidal sensor 126 of FIGS. 1A-1B) located in or near a tidal body of water (e.g., tidal body of water 104 of FIGS. 1A-1B). A tidal sensor data module (e.g., 210 of FIG. 2) of the drainage monitor may receive the tidal sensor data.

At block 306, a tidal time lag distribution is generated based on the drainage sensor data and the tidal sensor data. Whether a monitoring point exhibits system backflow (e.g., tidal water flowing into the set of outputs of 144a-d of FIGS. 1A-1B) can be determined by drainage sensors (e.g., drainage sensors 146a-d of FIGS. 1A-1B) (or manual inspection at the site) and recorded in a database. To model a drainage system (e.g., drainage system 120 of FIGS. 1A-1B) backflow associated with tidal effects (e.g., tidal water flowing into the system outputs) using data from a water level station (e.g., a station that includes one or more tidal sensors, such as but not limited to tidal sensor 126 of FIGS. 1A-1B), the time lag from tidal water level station to system backflow may be determined.

Figure 4:
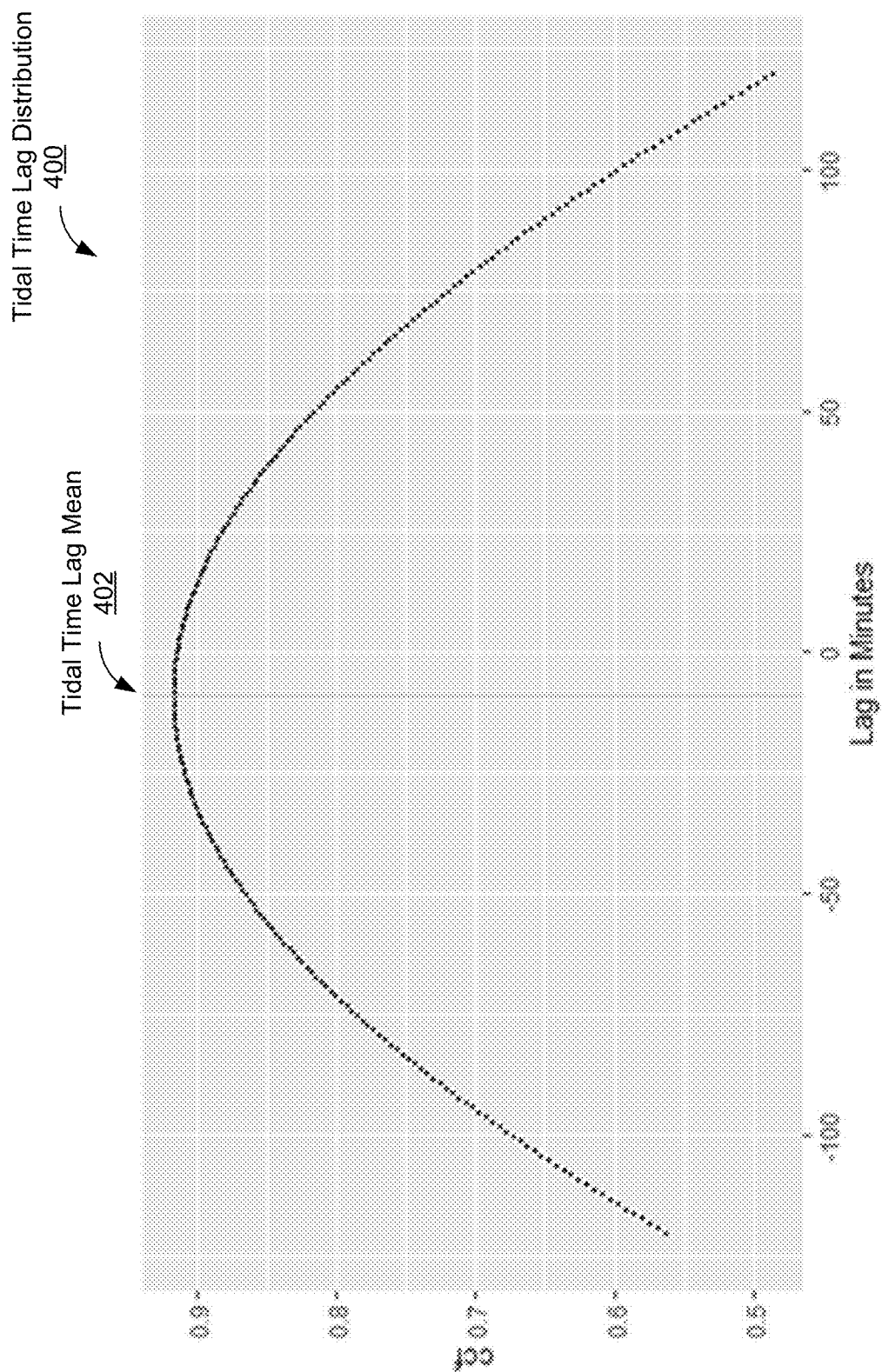
FIG. 4 shows a tidal time lag distribution for a particular drainage sensor at a particular monitoring point in a drainage system that is consistent with the various embodiments.

Turning to FIG. 4, FIG. 4 shows a tidal time lag distribution 400 for a particular drainage sensor at a particular monitoring point in a drainage system that is consistent with the various embodiments. The tidal time lag distribution 400 is a statistical distribution that indicates the time difference (e.g., the time lag) between when tidal waters start to rise and the time it takes (e.g., in minutes) from when the tidal water arrives at the particular drainage sensor (e.g., drainage sensor 146a) within the drainage sensor's associated flow path (e.g., flow path 140). Tidal time lag distribution shows that there is approximately a 10 minute lag between when the tidal water enters the drainage system's outputs (e.g., set of outputs 144a-d) and when the water arrives at the particular drainage sensor. Distribution 400 may be generated based on the drainage sensor data from the particular drainage sensor and one or more tidal sensors (e.g., tidal sensor 126 of FIGS. 1A-1B). In various embodiments, the distribution 400 may be generated from sensor data (e.g., drainage sensor data and tidal sensor data) accumulated during times when the drainage system's set of flow paths are relatively clear of stormwater. The distribution 400 may be generated by aligning the drainage sensor data and the tidal sensor data by shifting the x-axis of either the drainage sensor time-series data or the tidal sensor time-series data. A similar distribution may be separately generated for each drainage sensor at each monitoring point in the drainage system. The model generator 230 may employ the tidal and drainage sensor data to generate distribution 400 to determine the time (or temporal) lag mean.

At block 308, a tidal time lag mean 402 is determined based on the tidal time lag distribution 400. The tidal time lag mean is may be the mean value of the tidal time lag distribution 400. In the non-limiting embodiment of FIG. 4, the tidal time lag mean 402 is approximately 10 minutes. At block 310, the tidal sensor data is time-shifted based on the tidal mean lag. More specifically, the tidal sensor time-series is shifted such that the tidal sensor time scale approximately matches the time scale of the drainage sensor data. In the non-limiting embodiment of FIG. 4, the tidal sensor time-series data is shifted to the right by approximately 10 minutes (e.g., the tidal time lag mean). The model generator 230 may employ the temporal lag mean (as indicated by distribution 300) to time-shift time-series data from the water level station (tidal sensor data) to match the time-series data from the monitoring point. For many stormwater drainage systems, tidal-associated backflow starts at a water level of the tide station. The matched sensor data can be used to determine the tidal water level.

Figure 5:
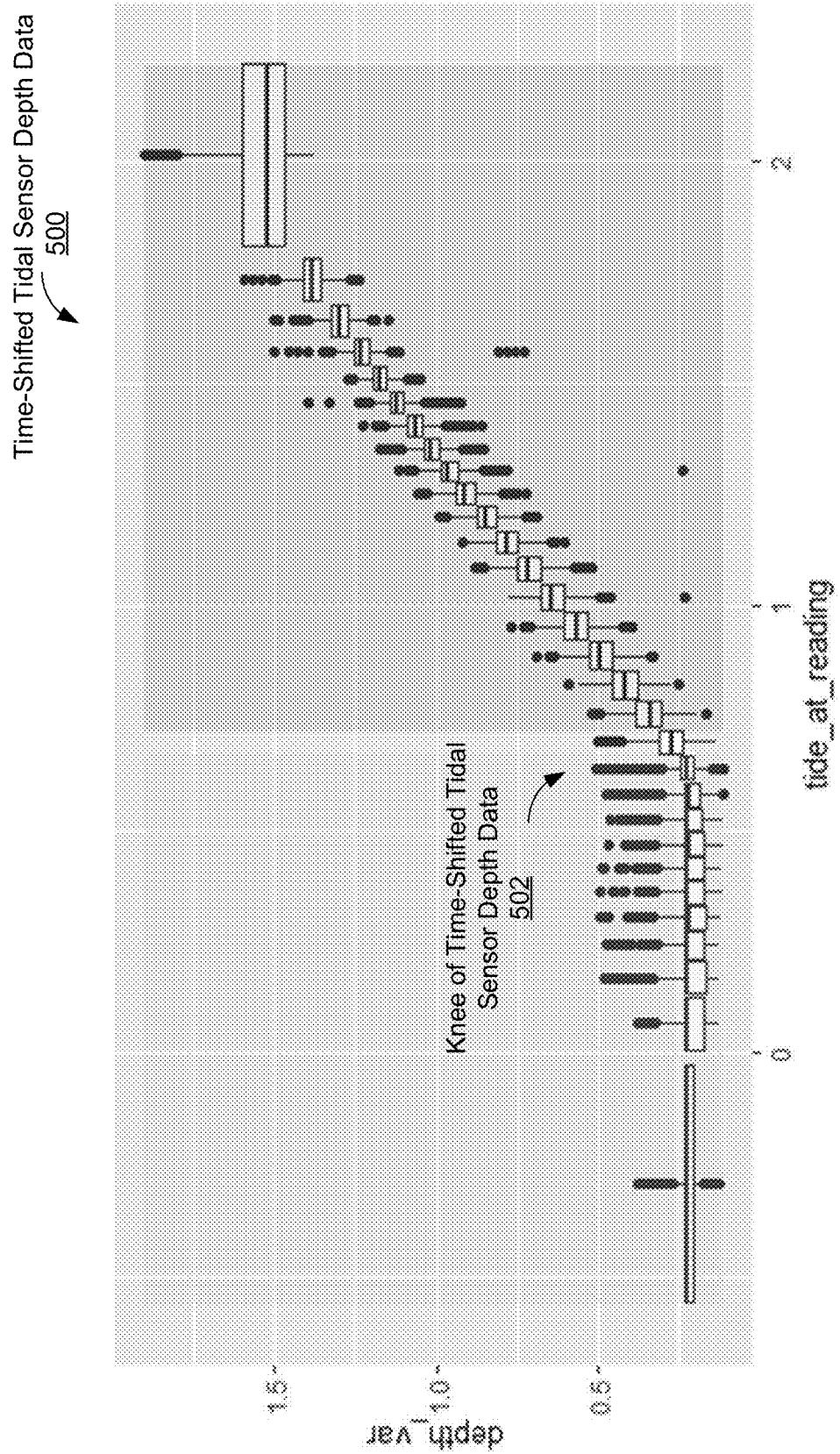
FIG. 5 shows time-shifted tidal sensor depth data that is consistent with the various embodiments.

At block 312, a start time of a tidal backflow (e.g., backflow of tidal water into the drainage system's set of outputs) is determined. The start time of the tidal backflow may be a start time of a tidal backflow event at a monitoring point of the drainage system. The determination of the start time of the tidal backflow is determined based on the time-shifted tidal sensor data. FIG. 5 shows time-shifted tidal sensor depth data 500 that is consistent with the various embodiments. The "knee" 502 of the of the time-shifted tidal sensor depth data indicates the start time of the tidal backflow. Depth measurements to the left of the knee 502 indicate that the tidal water is not backflowing into the drainage system, while depth measurements to the right of knee indicate that the tidal water in backflowing into the drainage system. In the non-limiting embodiment of FIG. 5, the knee 502 of the time-shifted tidal sensor depth data 500 occurs at approximately t=0.67.

Block 314 is an optional block in method 300. If the depth readings (or measurements) at a monitoring position are saturated, then the depth readings may be "clipped". At block 314, if depth clippings are presented, the clipped measurements may be determined and/or identified. The drainage sensor depth measurements may be adjusted for clipped depth measurements.

Figure 6:
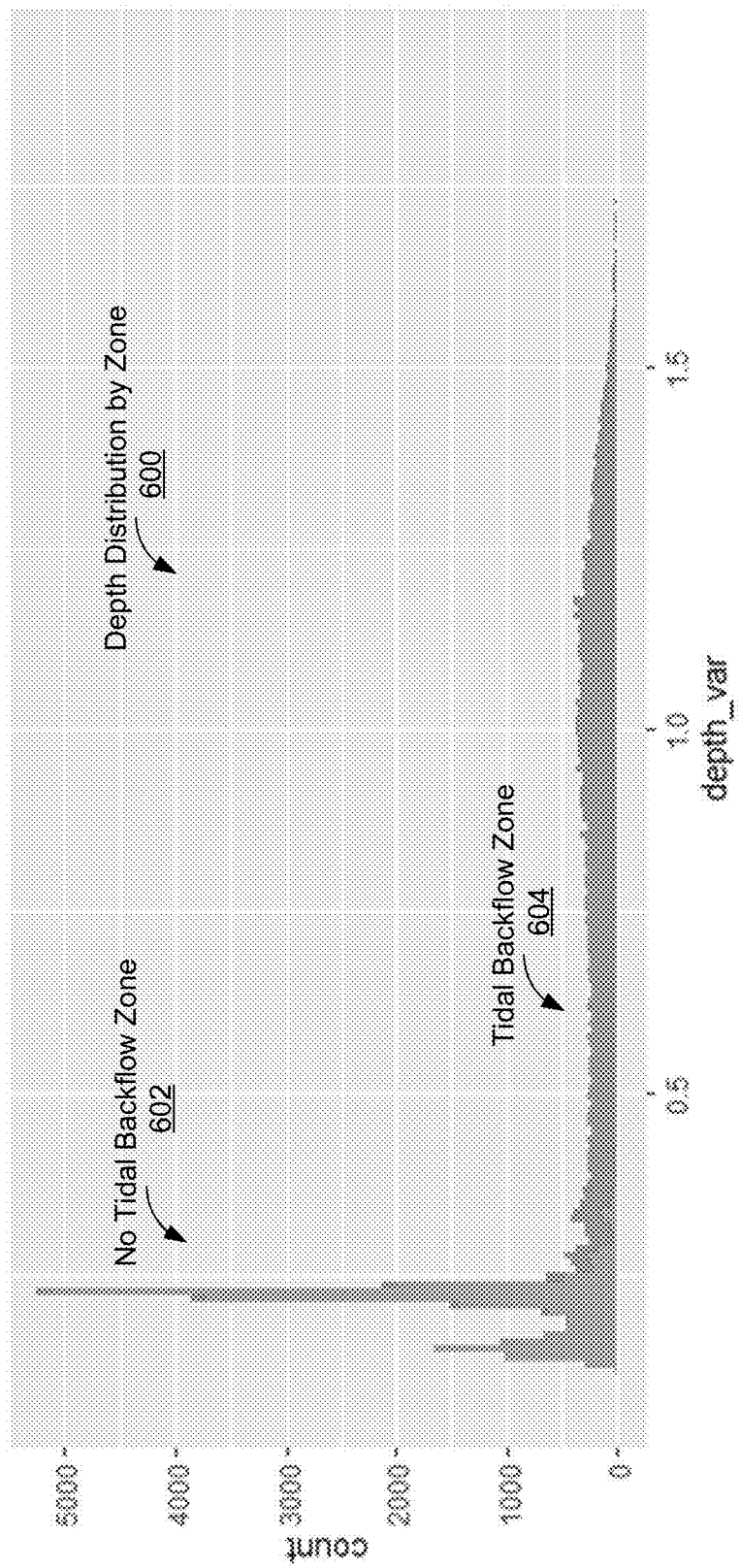
FIG. 6 shows a histogram of a depth distribution by zone that is consistent with the various embodiments.

Turning to FIG. 3B, a flow diagram is provided that illustrates a method 320 for decoupling stormwater and tidal water in a drainage system that is consistent with the various embodiments. Method 320 may be a continuation of method 300. After execution of optional block 314 (or of block 312) of method 300, method 320 may begin at block 322. At block 322, tidal backflow and no tidal backflow zones of the drainage sensor depth data may be determined. The tidal backflow and the no tidal backflow zones may be determined by generating a depth distribution from the drainage sensor depth data. FIG. 6 shows a histogram of a depth distribution 600 by zone that is consistent with the various embodiments. Depth distribution 600 includes a no tidal backflow zone 602 and a tidal backflow zone 604.

Figure 7:
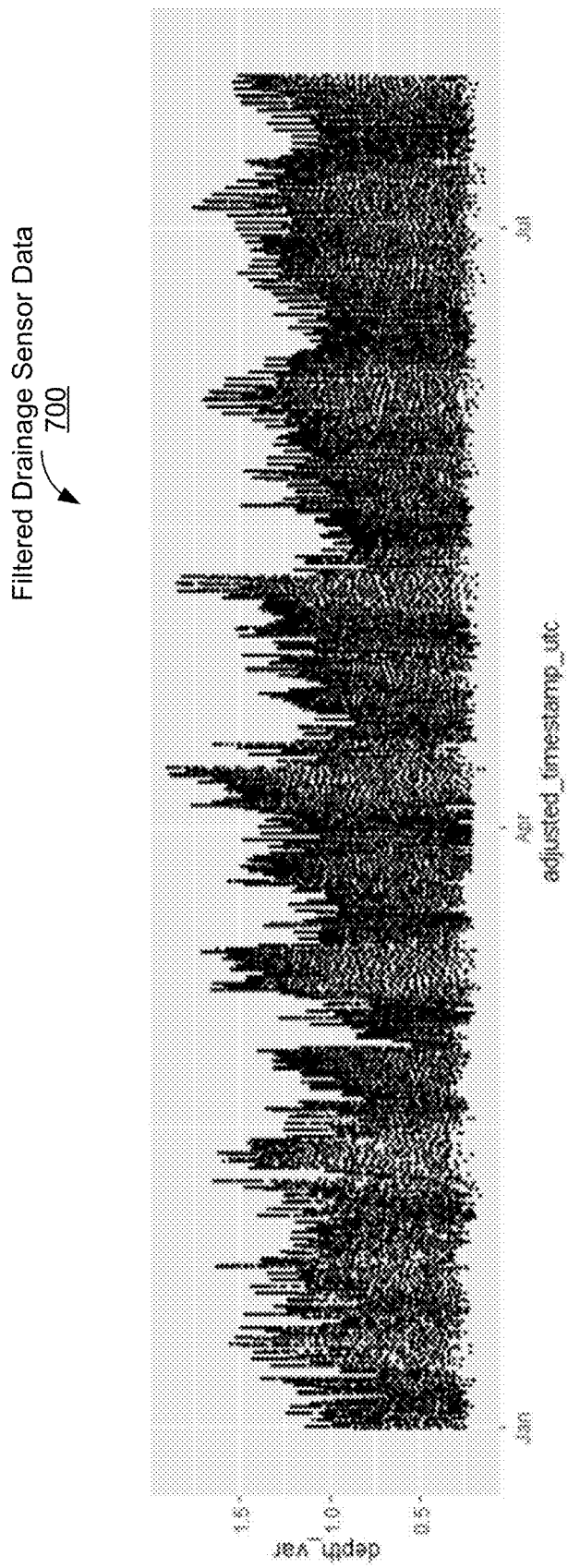
FIG. 7 shows a time-series of the filtered drainage sensor data 700 that is consistent with the various embodiments.

At block 324, the drainage sensor data in the tidal backflow zone is filtered. FIG. 7 shows a time-series of the filtered drainage sensor data 700 that is consistent with the various embodiments.

At block 326, a depth model may be generated based on the filtered drainage sensor data. The depth model may be a linear model. The model generator 230 may generate the mode. The model generator 230 may generate a linear model by fitting a linear function to that filtered drainage sensor data 700. In various embodiments, the model generator 230 may employ one or more linear regressions methods to the filtered data. The regression methods may determine one or more residuals when fitting the linear model to the filtered drainage sensor data.

At block 328, the portion of the water depth (at the monitoring point) due to the tidal back flow is determined and the portion of the depth (at the monitoring point) due to stormwater (or other sources) is determined based on the depth model. More particularly, when stormwater is flowing through the drainage system's set of flow paths, the stormwater and tidal water separator 240 may employ the fitted model to separate the depth of water in the flow path that is due to stormwater and the depth of water in the flow path that is due to tidal backflow. That is, the stormwater and tidal water separator 240 may employ the model to predict depth at the monitoring point based on tidal water level. The linear model may be applied based on data from the paired tidal water level station and drainage sensors to estimate a tidal associated backflow contribution to water level. The difference in the actual water level (e.g., as indicated by drainage sensors) and the estimated tidal water backflow contribution is attributable to some source other than tidal backflow (e.g., stormwater).

Figure 8:
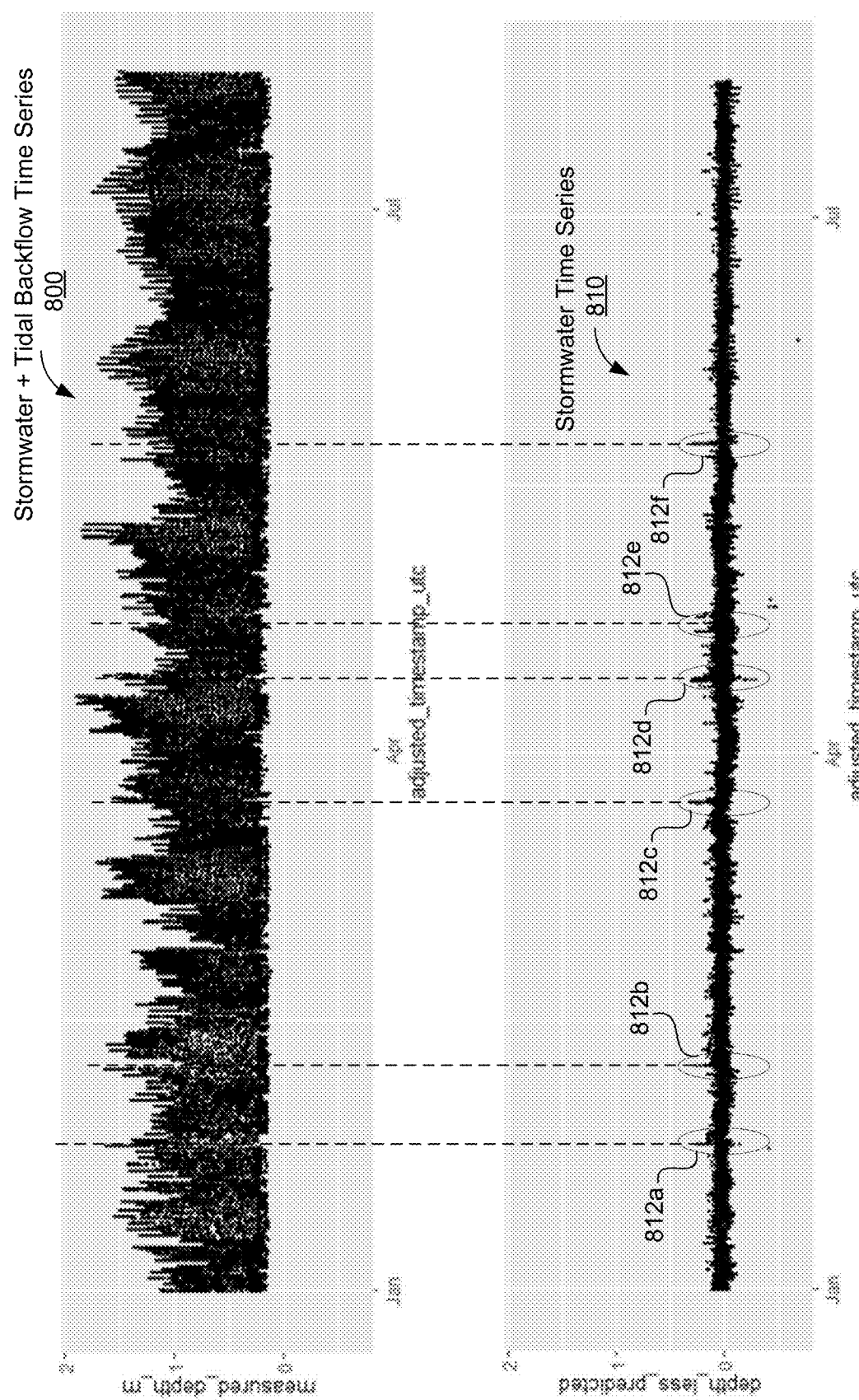
FIG. 8 shows a first time-series and a second time-series that are consistent with the various embodiments.

FIG. 8 shows a first time-series and a second time-series that are consistent with the various embodiments. First time-series 800 is a time-series from a monitoring point that includes both stormwater and tidal backflow. Second time-series 810 that includes the stormwater component of the first time-series 800. That is, in time-series 810, the tidal backflow component has been subtracted out. As noted above, the stormwater and tidal water separator 240 may subtract out the tidal backflow component from the first time-series 800.

At block 330, flow events that are due to stormwater are predicted and/or observed. That is, at block 330, flow events that are due to stormwater, with the tidal backflow component subtracted out, are identified in the second time-series 810 that includes only the stormwater component. The second time-series 810 shows six detected stormwater only flow events 812a-f. The hashed vertical lines show where these stormwater only flow events occur within the first time-series 800. A visual inspection of the first time-series 800 and the second time-series 810 show that, without subtracting out the tidal component, the identification of flow events attributable to stormwater only 812a-f, and not tidal water, are difficult to identify without subtracting out the tidal component.

Other Embodiments

The embodiments may be directed towards one or more of methods, system, and/or non-transitory computer readable storage media. In one exemplary, but non-limiting method embodiment, the method may include receiving first drainage sensor data from a set of drainage sensors located at a set of monitoring points in a set of flow paths of a drainage system. The first drainage sensor data may encode an indication of a first time-series of a depth of a fluid detected at by the set of drainage sensors located at the set on monitoring points within the drainage system. The fluid associated with the first drainage sensor data may include at least tidal-backflow water from a body of water that is subject to a tidal effect (e.g., a tidal body of water). The tidal effect of the body of water may include a rising of a tide of the body of water and/or a lowering of the tide of the body of water. In at least one embodiment, the fluid associated with the first drainage sensor data may further include stormwater. First tidal sensor data may be received from one or more tidal sensors. The first tidal sensor day may encode an indication of a first time-series of the tidal effect of the body of water. A depth model may be generated based on the first drainage sensor data and the first tidal sensor data. The depth model may model one or more statistical-correlations between the first time-series of the depth of fluid and the first tidal effect of the body of water. The depth model may be a linear model. Second drainage sensor data may be received from the set of drainage sensors located at the set of monitoring points in the set of flow paths of the drainage system. The second drainage sensor data may encode an indication of a second time-series of the depth of the fluid detected at the set on monitoring points within the drainage system. The fluid associated with the second drainage sensor data may include at least stormwater and the tidal-backflow water from the body of water. Second tidal sensor data may be received from the one or more tidal sensors. The second tidal sensor day may encode an indication of a second time-series of the tidal effect of the body of water. A first component of the second time-series of the depth of the fluid may be determined. Determining the first component of the second time-series of the depth of the fluid may be based on the depth model, the second drainage sensor data, and the second tidal sensor data. The first component of the second time-series of the depth of the fluid may indicate a depth associated with the stormwater.

In some embodiments, a second component of the second time-series of the depth of the fluid may be determined. Determining the second component of the second time-series of the depth of the fluid may be based on the depth model, the second drainage sensor data, and the second tidal sensor data. The second component of the second time-series of the depth of the fluid may indicate a depth associated with the tidal-backflow water. The method may further include determining the first component of the second time-series of the depth of the fluid based on a subtraction of the second component of the second time-series of the depth of the fluid from the second time-series of the depth of the fluid. In at least one embodiment, at least one flow event of the drainage system may be detected. Detecting the flow event may be based on the first component of the second time-series of the depth of the fluid. The at least one flow event may be associated with the stormwater.

In at least one embodiment, for each monitoring point of the set of monitoring points, a tidal time-lag distribution may be generated. Generating the tidal time-lag distribution for the monitoring point may be based on the first drainage sensor data and the first tidal sensor data. For each monitoring point of the set of monitoring points, a tidal time-lag offset may be determined. Determining the tidal time-lag offset may be based on the tidal time-lag distribution corresponding to the monitoring point. In at least one embodiment, the tidal time-lag offset for a monitoring point (corresponding to a drainage sensor) may be a mean value of the tidal time-lag distribution for the monitoring point. Generating the depth model may be based on the tidal lag offset for each monitoring point of the set of monitoring points.

In some embodiments, the method may further include time-shifting a time component of the first time-series of the tidal effect. Time-shifting the time component may be based on a tidal time-lag offset associated with the tidal effect and each monitoring point of the set of monitoring points. A start time for a tidal backflow event for a monitoring point of the set of monitoring points may be determined. Determining the start time for the tidal backflow event may be based on the shifted time component of the first time-series of the tidal effect. A tidal backflow zone for the monitoring point may be determined. Determining the tidal back zone for the monitoring point may be based on the start time for the tidal event for the monitoring point. The first time-series first time-series of the depth of fluid may be filtered in the tidal backflow zone for the monitoring point. The depth model may be generated based on the filtered first time-series first time-series of the depth of fluid.

In at least one embodiment, at least one depth clipping event in the first time-series first time-series of the depth of fluid may be identified. The first time-series first time-series of the depth of fluid may be updated and/or adjusted based on the identified depth clipping event. The depth model may be generated based on the updated first time-series first time-series of the depth of fluid.

In various embodiments, the method may further include determining the one or more statistical-correlations between the first time-series of the depth of fluid and the first tidal effect of the body of water. Determining the statistical-correlations may be based on one or more regressions algorithms. Generating the depth model may be based on the determined one or more statistical-correlations between the first time-series of the depth of fluid and the first tidal effect of the body. The one or more statistical-correlations between the first time-series of the depth of fluid and the first tidal effect of the body of water may include a temporal offset (e.g., a tidal time-lag offset for a monitoring point) between the first time-series of the depth of fluid and the first tidal effect of the body of water.

In some embodiments, the method may further include generating a report. The report may include at least an indication of predicted flow event of the drainage system. A prediction of the predicted flow event may be based on the depth model. The report may be provided to a user.

Generalized Computing Device

Figure 9:
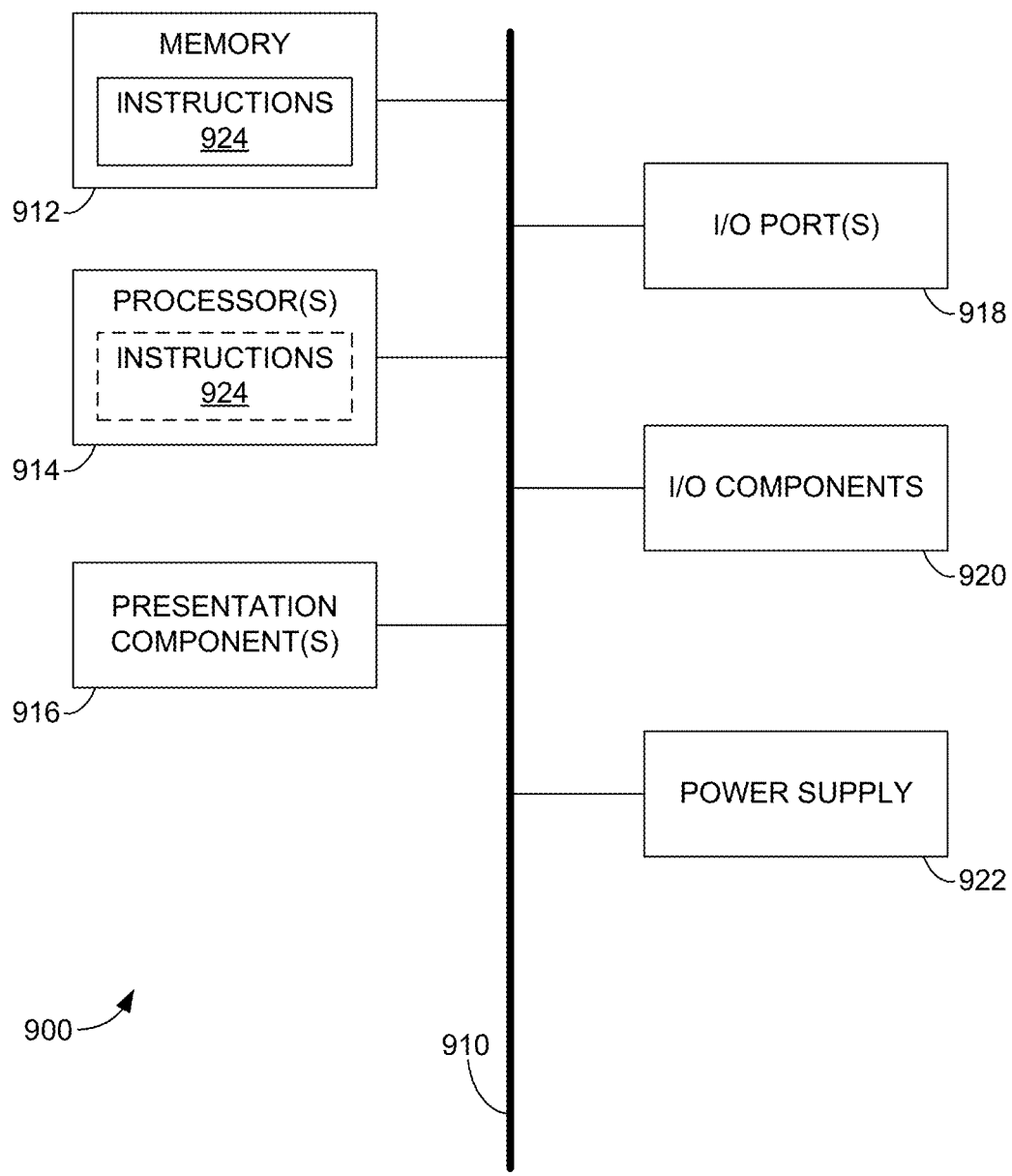
FIG. 9 is a block diagram of an exemplary computing environment suitable for use in implementing aspects of the technology described herein.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. In some implementations, presentation component 220 of system 200 may be embodied as a presentation component 916. Other examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for managing stormwater in a drainage system, the method comprising:
    receiving first drainage sensor data that encodes an indication of a first time-series of a depth of a fluid detected at a set on monitoring points within the drainage system, wherein the fluid associated with the first drainage sensor data includes at least tidal-backflow water from a body of water that is subject to a tidal effect;
    receiving first tidal sensor data that encodes an indication of a first time-series of the tidal effect of the body of water;
    generating a depth model based on the first drainage sensor data and the first tidal sensor data, wherein the depth model models one or more statistical-correlations between the first time-series of the depth of fluid and the first tidal effect of the body of water; and
    receiving second drainage sensor data that encodes an indication of a second time-series of the depth of the fluid detected at the set on monitoring points within the drainage system, wherein the fluid associated with the second drainage sensor data includes at least stormwater and the tidal-backflow water from the body of water;
    receiving second tidal sensor data that encodes an indication of a second time-series of the tidal effect of the body of water; and
    determining a first component of the second time-series of the depth of the fluid based on the depth model, the second drainage sensor data, and the second tidal sensor data, wherein the first component of the second time-series of the depth of the fluid indicates a depth associated with the stormwater.

2. The method of claim 1, further comprising:
    determining a second component of the second time-series of the depth of the fluid based on the depth model, the second drainage sensor data, and the second tidal sensor data, wherein the second component of the second time-series of the depth of the fluid indicates a depth associated with the tidal-backflow water; and
    determining the first component of the second time-series of the depth of the fluid based on a subtraction of the second component of the second time-series of the depth of the fluid from the second time-series of the depth of the fluid.

3. The method of claim 1, further comprising:
    detecting at least one flow event of the drainage system based on the first component of the second time-series of the depth of the fluid, wherein the at least one flow event is associated with the stormwater.

4. The method of claim 1, further comprising;
    for each monitoring point of the set of monitoring points, generating a tidal time-lag distribution based on the first drainage sensor data and the first tidal sensor data;
    for each monitoring point of the set of monitoring points, determining a tidal time-lag offset based on the tidal time-lag distribution corresponding to the monitoring point; and generating the depth model based on the tidal lag offset for each monitoring point of the set of monitoring points.

5. The method of claim 1, further comprising:
shifting a time component of the first time-series of the tidal effect based on a tidal time-lag offset associated with the tidal effect and each monitoring point of the set of monitoring points;
determining a start time for a tidal backflow event for a monitoring point of the set of monitoring points based on the shifted time component of the first time-series of the tidal effect;
determining a tidal backflow zone for the monitoring point based on the start time for the tidal event for the monitoring point;
filtering the first time-series first time-series of the depth of fluid in the tidal backflow zone for the monitoring point; and
generating the depth model based on the filtered first time-series first time-series of the depth of fluid.

6. The method of claim 1, further comprising:
identifying at least one depth clipping event in the first time-series first time-series of the depth of fluid;
updating the first time-series first time-series of the depth of fluid based on the identified depth clipping event; and
generating the depth model based on the updated first time-series first time-series of the depth of fluid.

7. The method of claim 1, further comprising:
determining the one or more statistical-correlations between the first time-series of the depth of fluid and the first tidal effect of the body of water based on one or more regressions algorithms; and
generating the depth model based on the determined one or more statistical-correlations between the first time-series of the depth of fluid and the first tidal effect of the body.

8. The method of claim 1, wherein the depth model is a linear model.

9. The method of claim 1, further comprising:
generating a report that includes at least an indication of predicted flow event of the drainage system, wherein a prediction of the predicted flow event is based on the depth model; and
providing the report to a user.

10. The method of claim 1, wherein the one or more statistical-correlations between the first time-series of the depth of fluid and the first tidal effect of the body of water include a temporal offset between the first time-series of the depth of fluid and the first tidal effect of the body of water and the tidal effect of the body of water includes a rising of a tide of the body of water and a lowering of the tide of the body of water.

11. A system comprising:
one or more hardware processors; and
one or more computer-readable media having executable instructions embodied thereon, which, when executed by the one or more processors, cause the one or more hardware processors to execute actions method for managing stormwater in a drainage system, the actions comprising:
receiving first drainage sensor data that encodes an indication of a first time-series of a depth of a fluid detected at a set on monitoring points within the drainage system, wherein the fluid associated with the first drainage sensor data includes at least tidal-backflow water from a body of water that is subject to a tidal effect;
receiving first tidal sensor data that encodes an indication of a first time-series of the tidal effect of the body of water;
generating a depth model based on the first drainage sensor data and the first tidal sensor data, wherein the depth model models one or more statistical-correlations between the first time-series of the depth of fluid and the first tidal effect of the body of water; and
receiving second drainage sensor data that encodes an indication of a second time-series of the depth of the fluid detected at the set on monitoring points within the drainage system, wherein the fluid associated with the second drainage sensor data includes at least stormwater and the tidal-backflow water from the body of water;
receiving second tidal sensor data that encodes an indication of a second time-series of the tidal effect of the body of water; and
determining a first component of the second time-series of the depth of the fluid based on the depth model, the second drainage sensor data and the second tidal sensor data, wherein the first component of the second time-series of the depth of the fluid indicates a depth associated with the stormwater.

12. The system of claim 11, wherein the actions further comprise:
determining a second component of the second time-series of the depth of the fluid based on the depth model, the second drainage sensor data, and the second tidal sensor data, wherein the second component of the second time-series of the depth of the fluid indicates a depth associated with the tidal-backflow water; and
determining the first component of the second time-series of the depth of the fluid based on a subtraction of the second component of the second time-series of the depth of the fluid from the second time-series of the depth of the fluid.

13. The system of claim 11, wherein the actions further comprise:
detecting at least one flow event of the drainage system based on the first component of the second time-series of the depth of the fluid, wherein the at least one flow event is associated with the stormwater.

14. The system of claim 11, wherein the actions further comprise:
for each monitoring point of the set of monitoring points, generating a tidal time-lag distribution based on the first drainage sensor data and the first tidal sensor data;
for each monitoring point of the set of monitoring points, determining a tidal time-lag offset based on the tidal time-lag distribution corresponding to the monitoring point; and
generating the depth model based on the tidal lag offset for each monitoring point of the set of monitoring points.

15. The system of claim 11, wherein the actions further comprise:
shifting a time component of the first time-series of the tidal effect based on a tidal time-lag offset associated with the tidal effect and each monitoring point of the set of monitoring points;

determining a start time for a tidal backflow event for a monitoring point of the set of monitoring points based on the shifted time component of the first time-series of the tidal effect;

determining a tidal backflow zone for the monitoring point based on the start time for the tidal event for the monitoring point;

filtering the first time-series first time-series of the depth of fluid in the tidal backflow zone for the monitoring point; and generating the depth model based on the filtered first time-series first time-series of the depth of fluid.

16. The system of claim 11, wherein the actions further comprise:

identifying at least one depth clipping event in the first time-series first time-series of the depth of fluid;

updating the first time-series first time-series of the depth of fluid based on the identified depth clipping event; and generating the depth model based on the updated first time-series first time-series of the depth of fluid.

17. The system of claim 11, wherein the actions further comprise:

determining the one or more statistical-correlations between the first time-series of the depth of fluid and the first tidal effect of the body of water based on one or more regressions algorithms; and generating the depth model based on the determined one or more statistical-correlations between the first time-series of the depth of fluid and the first tidal effect of the body.

18. One or more computer storage media storing computer-usable instructions that, when used by one or more computing devices, cause the one or more computing devices to perform actions for managing stormwater in a drainage system, the actions comprising:

receiving first drainage sensor data that encodes an indication of a first time-series of a depth of a fluid detected at a set on monitoring points within the drainage system, wherein the fluid associated with the first drainage sensor data includes at least tidal-backflow water from a body of water that is subject to a tidal effect;

receiving first tidal sensor data that encodes an indication of a first time-series of the tidal effect of the body of water;

generating a depth model based on the first drainage sensor data and the first tidal sensor data, wherein the depth model models one or more statistical-correlations between the first time-series of the depth of fluid and the first tidal effect of the body of water; and receiving second drainage sensor data that encodes an indication of a second time-series of the depth of the fluid detected at the set on monitoring points within the drainage system, wherein the fluid associated with the second drainage sensor data includes at least stormwater and the tidal-backflow water from the body of water;

receiving second tidal sensor data that encodes an indication of a second time-series of the tidal effect of the body of water; and determining a first component of the second time-series of the depth of the fluid based on the depth model, the second drainage sensor data, and the second tidal sensor data, wherein the first component of the second time-series of the depth of the fluid indicates a depth associated with the stormwater.

19. The media of claim 18, wherein the actions further comprise:

generating a report that includes at least an indication of predicted flow event of the drainage system, wherein a prediction of the predicted flow event is based on the depth model; and providing the report to a user.

20. The media of claim 18, wherein the one or more statistical-correlations between the first time-series of the depth of fluid and the first tidal effect of the body of water include a temporal offset between the first time-series of the depth of fluid and the first tidal effect of the body of water and the tidal effect of the body of water includes a rising of a tide of the body of water and a lowering of the tide of the body of water.

* * * * *